Patented Nov. 3, 1936

2,059,476

UNITED STATES PATENT OFFICE 2,059,476

DYESTUFFS OF THE ANTHRAQUINONE SERIES

Paul Nawiasky, Ludwigshafen - on - the - Rhine, Berthold Stein, Mannheim, and Robert Zell, Ludwigshafen-on-the-Rhine, Germany, assignors to General Aniline Works, Inc., New York, N. Y., a corporation of Delaware No Drawing. Application January 6, 1934, Serial No. 705,620. In Germany January 21, 1933

15 Claims. (Cl. 260—60)

The present invention relates to valuable dyestuffs of the anthraquinone series suitable for dyeing animal fibres and a process of producing same.

We have found that valuable dyestuffs of the anthraquinone series corresponding to the general formula

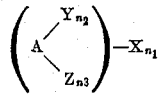

(wherein A means an anthraquinone radicle, $n_1$, $n_2$ and $n_3$ are whole numbers above zero, X a —$SO_3H$ group, Y a group —$N.R_1R_2$ attached to an alpha-position of the said anthraquinone radicle and Z a radicle —$CO.N.R_3R_4$, wherein $R_1$, $R_3$ and $R_4$ stand for hydrogen or alkyl, cycloalkyl, aralkyl, hydroxyalkyl, aryl or substituted aryl groups and $R_2$ stands for hydrogen or an alkyl, cycloalkyl or aralkyl group) are obtained by using as initial material an anthraquinone containing at least one of the substituents X, Y and Z as defined above and acting thereon with an agent introducing the missing of the said substituents. The term "substituted aryl groups" used in the above definition of $R_1$, $R_3$ and $R_4$ is meant to include aryls substituted by halogen or alkyl, cycloalkyl, hydroxyl, alkoxyl, amino and acylated amino groups. $n_1$ is usually a whole number from 1 to 4 inclusive, $n_2$ a whole number from 1 to 4, preferably from 1 to 2 and $n_3$ a whole number from 1 to 2. Besides the substituents defined above further substituents may be introduced into the products or such initial materials may be employed as contain already such further substituents. For example further amino or substituted amino groups, preferably attached to α-positions, further carboxyl-amido groups may be present; groups of the latter kind are preferably attached to beta-positions of the anthraquinone nucleus. As already indicated by the above formula one or two or even more sulphonic acid groups may be present in the final products. They may be attached to the anthraquinone nucleus or to any of the substituents; for example the sulphonic groups may be present in the carboxyl amido groups, or in the alpha-amino group; the sulphonic acid group is not attached directly to the amino group but by way of other linking members, as for example in the grouping —$NH$—$CH_2$—$CH_2$—$SO_3H$ or —$NH$—$CH_2$—$CH_2$—$O$—$SO_3H$ or —$N(CH_3)$—$C_6H_4$—$SO_3H$.

In the following it is set forth in greater detail how the process may be carried out. For example sulphonic groups may be introduced into alpha-aminoanthraquinones which have carboxylic acid amide groups of the kind defined above in the anthraquinone nucleus, or by introducing carboxylic acid amide groups into alpha-aminoanthraquinones containing sulphonic groups or employing both methods simultaneously with alpha-aminoanthraquinones containing neither of the said groups. The formation of the carboxyl amido group may be effected by converting the carboxylic acid group into the carboxyl amido group or by partial saponification of the cyano group. Instead of starting from alpha-aminoanthraquinones, other anthraquinones already containing carboxylic acid amide and sulphonic groups may be employed, the alpha-amino group being introduced subsequently. Introduction of the alpha-amino group and the conversion of the carboxylic groups (or functional derivatives thereof, such as acid chloride groups) may be effected simultaneously.

For example a 1-nitroanthraquinone-2-carboxylic acid may be converted into the corresponding acid chloride, the nitro group and the chlorine atom introduced into the acid radicle being simultaneously or consecutively replaced by the $NH_2$ group or the same or different substituted amino groups and the resulting product subjected to sulphonation. The replacement of the nitro group by the amino group may be effected by reduction or by treatment with ammonia or amines. Alternatively, an arylamine which is substituted in the aryl radicle by a sulphonic group may be caused to act on an alpha-aminoanthraquinone-beta-carboxylic acid amide negatively substituted in a further alpha-position.

By starting with α-aminoanthraquinones and introducing such substituted carboxylic acid amido groups as contain a sulphonic acid group or by starting with anthraquinone-carboxylic-acid-amides and introducing alpha-amino groups which in a substituent contain a sulpho group the introduction of two substituents may be effected simultaneously. For example 1-aminoanthra-quinone-2-carboxylic acid chloride may be reacted with methyl-taurine, the formation of the carboxylic acid amide group and the introduction of the sulpho group thus being effected in one operation.

The resulting dyestuffs yield powerful dyeings on animal fibres, the said dyeings being in part distinguished by special clarity. The dyestuffs yield very level dyeings of very good fastness to light. A deepening in the shade of color of the dyestuffs may be effected by the introduction of further substituents such as halogen, amino, substituted amino and hydroxy groups into the molecule.

The following examples will further illustrate the nature of this invention but the invention is not restricted to these examples. The parts are by weight.

*Example 1*

10 parts of 1-amino-4-bromanthraquinone-2-carboxylic acid amide

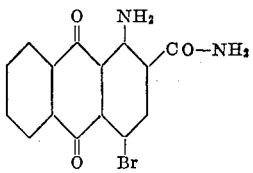

(obtainable from 1-nitroanthraquinone-2-carboxylic acid chloride by treatment with aqueous ammonia under pressure at elevated temperature and subsequent bromination in an aqueous hydrochloric acid medium) are heated at 130° C. with 40 parts of paratoluidine in the presence of 6 parts of anhydrous potassium acetate and 0.1 part of copper acetate until initial material can practically no longer be detected. From 80 to 100 parts of methanol are then introduced into the melt, the separation of the resulting 1-amino-4-(para-toluidino)-anthraquinone-2-carboxylic acid amide thus taking place in the form of beautiful crystals. After crystallization from aniline, the product has a melting point of from 255° to 257° C. It is then subjected to sulphonation by means of low-grade fuming sulphuric acid at ordinary temperature, a sulphonic acid being obtained which dyes wool from an acid bath clear blue shades. The sulphonic acid group is probably fixed to the toluidine radicle.

*Example 2*

35 parts of 1-amino-4-bromanthraquinone-2-carboxylic acid amide are heated to boiling with 50 parts of para-aminodiphenyl $NH_2$—$C_6H_4$—$C_6H_5$ in the presence of 20 parts of anhydrous potassium acetate and 0.35 part of copper acetate in 500 parts of amyl alcohol until the exchange of bromine is practically completed and initial material can no longer be detected. The reaction product which crystallizes out on cooling is filtered off by suction after cooling and probably constitutes 1-amino-4-(para-diphenyl)-aminoanthraquinone-2-carboxylic acid amide. For the purpose of purification, the compound may be crystallized from aqueous pyridine. In a pure form it has a melting point of from 258° to 260° C.; it dissolves in pyridine giving a green-blue coloration. By the action of sulphuric acid monohydrate at room temperature, sulphonation takes place with the formation of a dyestuff which dyes wool green-blue shades from an acid bath.

If the 1-amino-4-bromanthraquinone-2-carboxylic acid amide be replaced by the equivalent amount of 1-methylamino-4-bromanthraquinone-2-carboxylic acid methyl amide, 1-methylamino-4-(para-diphenyl)-aminoanthraquinone-2-carboxylic acid methyl-amide is obtained. The purified base has a melting point of from 245° to 247° C. and may be readily sulphonated by means of sulphuric acid monohydrate at ordinary temperature; the sulphonic acid obtained dyes wool powerful green shades.

If the process described in the preceding paragraph be carried out in monochlorbenzene and the aminodiphenyl be replaced by para-phenylenediamine, 1-methylamino-4-(para-aminophenyl)-aminoanthraquinone-2-carboxylic acid methylamide having a melting point of from 258° to 260° C. is obtained. The sulphonic acid derived from this substance dyes wool beautiful green shades.

*Example 3*

35 parts of 1-amino-4-bromanthraquinone-2-carboxylic acid amide are heated to boiling with 41 parts of para-phenylenediamine and 500 parts of monochlorbenzene with an addition of 0.35 part of copper acetate and 20 parts of anhydrous potassium acetate while stirring until initial material can no longer be detected. In order to separate the 1-amino-4-(para-aminophenyl)-aminoanthraquinone-2-carboxylic acid amide, 500 parts of methanol are added while hot, the whole is allowed to cool while stirring and filtered by suction. By boiling with alcohol and crystallization from nitrobenzene, the product may be crystallized if desired. It melts at from 270° to 272° C. and dissolves in pyridine giving a greenish blue coloration. For the purpose of sulphonation it is dissolved in sulphuric acid monohydrate and 23 per cent oleum is added at room temperature until it is entirely converted into a water-soluble form. The resulting sulphonic acid dyes wool greenish blue shades from an acid bath.

*Example 4*

10 parts of 1-methylamino-4-bromanthraquinone-2-carboxylic acid methyl amide (obtainable from 1-nitroanthraquinone-2-carboxylic acid chloride by treatment with methylamine and subsequent bromination) are stirred at from 100° to 120° C. with 40 parts of para-toluidine in the presence of 5.5 parts of anhydrous potassium acetate and 0.1 part of copper acetate until the color of a sample in pyridine undergoes no further change. In order to separate the reaction product, the melt is treated while hot with 70 parts of methanol, stirred until cold and filtered by suction. The resulting 1-methylamino-4-(para-toluidino)-anthraquinone-2-carboxylic acid methylamide may be crystallized from aqueous pyridine and then has a melting point of from 251° to 253° C. The sulphonic acid obtainable therefrom by sulphonation dyes wool bluish-green shades.

*Example 5*

If the para-toluidine in Example 4 be replaced by aniline, 1-methylamino-4-anilidoanthraquinone-2-carboxylic acid methylamide is obtained having a melting point of from 216° to 218° C. This compound may be very readily sulphonated; the sulphonic acid, isolated in the usual manner, dyes wool greenish-blue shades.

*Example 6*

10 parts of 1-amino-4-bromanthraquinone-2-carboxylic acid methylamide (obtainable by the treatment of 1-nitro-anthraquinone-2-carboxylic acid methyl amide with aqueous concentrated ammonia at 120° C. under a pressure and subsequent bromination) are stirred at from 125° to 130° C. with 40 parts of para-toluidine in the presence of 5.8 parts of anhydrous potassium acetate and 0.1 part of copper acetate until unchanged initial material can no longer be detected. The resulting 1-amino-4-toluidinoanthraquinone-2-carboxylic acid methylamide is separated by the addition of 80 parts of methanol to the hot melt. For the purpose of further purification, the product may be crystallized from aqueous pyridine and then has a melting point of from 242° to 244° C. It is dissolved in sulphuric acid monohydrate and 23 per cent oleum is gradually added until unsulphonated initial material can no longer be detected. The sulphonic acid thus obtained dyes wool clear blue shades from an acid bath.

*Example 7*

36 parts of 1-amino-4-bromanthraquinone-2-carboxylic acid methyl amide together with 51 parts of para-aminodiphenyl are dissolved in 500 parts of amyl alcohol and heated to boiling in the presence of 20 parts of anhydrous potassium acetate and 0.35 part of copper acetate. The reaction takes place rapidly. When initial material containing bromine can no longer be detected, the reaction mixture is allowed to cool to 40° C., the deposited substance is filtered off by suction, washed with alcohol and finally with hot water. The 1 - amino-4-(para-diphenyl)-aminoanthraquinone-2-carboxylic acid methyl amide, when crystallized from aqueous pyridine, has a melting point of from 251° to 254° C. By sulphonation, a sulphonic acid is obtained which dyes animal fibres greenish-blue shades.

If the para-aminodiphenyl be replaced by the equivalent amount of para-phenylenediamine, and the amyl alcohol by monochlorbenzene, 1-amino-4-(para - aminophenyl)-aminoanthraquinone-2-carboxylic acid methyl amide is formed which (crystallized from aqueous pyridine) has a melting point of from 228° to 230° C. The product is sulphonated at ordinary temperature in sulphuric acid monohydrate by means of 23 per cent oleum; the sulphonic acid obtained dyes animal fibres bluish-green shades.

*Example 8*

10-parts of 1-methylamino-4-bromanthraquinone-2-carboxylic acid amide (obtainable by the treatment of 1-nitro-anthraquinone-2-carboxylic acid amide with aqueous 50 per cent methylamine in a closed vessel at from 60 to 65° C. and subsequent bromination), 40 parts of para-toluidine, 5.8 parts of anhydrous potassium acetate and 0.1 part of copper acetate are heated together at 130° C. while stirring until initial material can no longer be microscopically observed in a sample withdrawn. In order to isolate the 1-methylamino-4-(para-toluidino)-anthraquinone-2-carboxylic acid amide formed, 80 parts of methanol are added to the reaction mixture. After crystallizing from aqueous pyridine, it has a melting point of from 265° to 267° C. The sulphonic acid obtainable from this product by sulphonation in the usual manner dyes wool bluish-green shades.

If the para-toluidine be replaced by aniline, the corresponding anilido compound is obtained under similar conditions; the sulphonic acid dyes wool greenish-blue shades.

*Example 9*

36 parts of 1-methylamino-4-bromanthraquinone-2-carboxylic acid amide and 51 parts of para-aminodiphenyl are dissolved in 500 parts of amyl alcohol and heated to boiling in the presence of 20 parts of anhydrous potassium acetate and 0.35 part of copper acetate. When the formation of dyestuff is completed, the whole is allowed to cool; the deposited 1-methylamino-4-(para-diphenyl)-aminoanthraquinone-2-carboxylic acid amide is then isolated in the usual manner. It has a melting point of from 271° to 273° C. The sulphonic acid obtainable therefrom by sulphonation with weak oleum dyes wool green shades.

An acid wool dyestuff which also dyes wool green shades is obtained by replacing the para-aminodiphenyl by para-phenylene diamine and the amyl alcohol by monochlorbenzene, the 1-methylamino - 4 - (para-aminophenyl) - aminoanthraquinone-2-carboxylic acid amide first formed being sulphonated in the usual manner.

*Example 10*

20 parts of 1-cyclohexylamino-4-bromanthraquinone-2-carboxylic acid amide (obtainable by the treatment of 1-nitro-anthraquinone-2-carboxylic acid amide with cyclohexylamine in boiling pyridine and subsequent bromination) are heated for some time at 130° C. with 200 parts of para-toluidine in the presence of 10 parts of anhydrous potassium acetate and 0.2 part of copper acetate while stirring. From 300 to 350 parts of methanol are added to isolate the resulting product. The product, 1-cyclohexylamino-4-(para-toluidino)-anthraquinone-2-carboxylic acid amide, may be sulphonated with low-grade fuming sulphuric acid. The sulphonic acid thus obtainable dyes wool blue-green shades.

*Example 11*

10 parts of 1-methylamino-4-bromanthraquinone-2-carboxylic acid cyclohexylamide (obtainable from 1-nitroanthraquinone-2-carboxylic acid cyclohexylamide by heating with methylamine in pyridine solution and subsequent bromination) are stirred at 130° C. with 50 parts of para-toluidine in the presence of 0.2 part of copper acetate and 6 parts of potassium acetate until initial material can no longer be detected. The 1-methylamino - 4 - (para-toluidino)-anthraquinone-2-carboxylic acid cyclohexylamide formed, which when crystallized from nitrobenzene has a melting point of from 246° to 248° C. is separated. The sulphonic acid obtainable therefrom by sulphonation in the usual manner dyes wool clear blue-green shades.

*Example 12*

10 parts of 1-amino-4-bromanthraquinone-2-carboxylic acid cyclohexylamide (obtainable from 1-nitroanthraquinone-2-carboxylic acid cyclohexylamide by treatment with an excess of concentrated aqueous ammonia at 120° C. and subsequent bromination) are converted, by treatment in the usual manner with 100 parts of para-toluidine in the presence of potassium acetate and copper acetate, into 1-amino-4-(para-toluidino)-anthraquinone-2-carboxylic acid cyclohexylamide which has a melting point of from 228° to 230° C. when crystallized from nitrobenzene. The sulphonic acid obtainable therefrom by sulphonation in the usual manner dyes animal fibres clear blue shades from an acid bath.

*Example 13*

If the 1-amino-4-bromanthraquinone-2-carboxylic acid methylamide in Example 6 be replaced by 1-hydroxyethylamino-4-bromanthraquinone-2-carboxylic acid cyclohexylamide (obtainable by the treatment of 1-nitro-anthraquinone-2-carboxylic acid cyclohexylamide with monoethanolamine in boiling pyridine and subsequent bromination) a compound is obtained which has a melting point of from 223° to 225° C. The sulphonic acid obtainable therefrom by sulphonation in the usual manner yields dyeings of a blue shade on wool, the dyeings being distinguished by great clarity.

In an analogous manner, 1-hydroxyethylamino-4-(para-toluidino)-anthraquinone-2-carboxylic acid hydroxyethylamide may be obtained which, stirred with 96 per cent sulphuric acid at ordinary temperature, yields a sulphonic acid which gives greenish-blue dyeings on wool. The corresponding anilido compound yields more bluish dyeings. 1-amino-4-(para-aminophenyl)-aminoanthraquinone-2-carboxylic acid hydroxyethylamide may be obtained in an analogous manner. The sulphonic acid obtained therefrom dyes wool blue-green shades.

Example 14

10 parts of 1-nitroanthraquinone-2-carboxylic acid chloride are stirred with aniline at 80° C. until initial material can no longer be detected. 40 parts of methanol are then added in order to separate the product. 1-anilidoanthraquinone-2-carboxylic anilide having a melting point of from 179° to 181° C. is obtained. After crystallization from aqueous glacial acetic acid, the compound melts at from 194° to 195° C. It is sulphonated by treatment with sulphuric acid monohydrate; the sulphonic acid dyes wool Bordeaux red shades from an acid bath. It yields red dyeings on chrome-mordanted wool.

Example 15

10 parts of 1-nitroanthraquinone-2-carboxylic acid amide are fused at 80° C. with 50 parts of para-toluidine. The nitro group is thus replaced by the toluidine radicle. The reaction is completed when a sample of the melt, examined microscopically, no longer contains initial material. 65 parts of methanol are added to the reaction mixture in order to separate 1-(para-toluidine)-anthraquinone-2-carboxylic acid amide; the crude product has a melting point of from 269° to 271° C. By sulphonating in the usual manner, a sulphonic acid is obtained which dyes wool strawberry-red shades from an acid bath.

Example 16

10 parts of 1-nitroanthraquinone-2-carboxylic acid methylamine are heated at 80° C. with 50 parts of para-toluidine until all the nitro compound has disappeared. For the purpose of working up, the melt is taken up in 300 parts of methanol, rendered strongly acid with hydrochloric acid, and diluted with 500 parts of hot water. 1-para-toluidinoanthraquinone-2-carboxylic acid methylamide is thus deposited in the form of lustrous leaflets having a melting point of from 228° to 230° C. When sulphonated in the usual manner it dyes wool reddish-orange shades.

Example 17

6 parts of 1.4-diaminoanthraquinone-2-carboxylic acid amide are introduced into a mixture of 4 parts of crystalline boric acid and 80 parts of fuming sulphuric acid, containing 23 per cent of sulphur trioxide at 50° C. After a short time 40 parts of fuming sulphuric acid of the same concentration are added while raising the temperature to 100° C. The said temperature is maintained until a sample of the reaction mixture is completely soluble in water. The reaction mixture is allowed to cool and poured into 300 parts of water containing a small amount of bisulphite. The compound of the reaction product with boric acid is split up by heating to boiling for a short time. After allowing to cool, the reaction mixture is filtered by suction and washed with a little cold water. The sulphonic acid thus obtained may be purified by way of its sodium salt, if desired. The reaction product probably contains the sulphonic acid group in that part of the anthraquinone nucleus which is not otherwise substituted. The product obtained dyes wool from an acid bath reddish-blue shades.

Example 18

10 parts of 1-amino-4-bromanthraquinone-2-carboxylic acid chloride are stirred with a solution of 9 parts of the sodium salt of methyltaurine and 4 parts of calcined soda in 120 parts of water at ordinary temperature until a sample dissolves completely in warm water. The reaction mixture is filtered by suction and washed with a solution of sodium chloride. The reaction product which is probably the sodium salt of 1-amino-4-bromanthraquinone-2-carboxylic acid methyltauride dyes wool from an acid bath clear orange-red shades.

If the bromine in the reaction product be substituted by the para-toluidine radicle by heating with para-toluidine in the presence of anhydrous sodium acetate and a small amount of cupric acetate, a dyestuff is obtained which dyes wool from an acid bath greenish-blue shades. Using cyclohexylamine instead of para-toluidine the corresponding cyclohexylamine derivative is obtained in an analogous manner; the said product dyes wool reddish-blue shades.

Example 19

10 parts of 1-nitroanthraquinone-2-carboxylic acid methyltauride sodium salt (which can be obtained by stirring 1-nitroanthraquinone-2-carboxylic acid chloride with an aqueous solution of methyl taurine sodium salt in the presence of soda at room temperature) are stirred together with 6 parts of cyclohexylamine in 50 parts of water at between 80° and 90° C. until the coloration of the mixture which soon turns to red no longer changes. The excess of cyclohexylamine is removed by steaming and the dyestuff formed is precipitated by means of sodium chloride solution after acidification by means of acetic acid. The reaction product which is probably the sodium salt of 1-cyclohexylaminoanthraquinone-2-carboxylic acid methyltauride, dyes wool from an acid bath beautiful bluish-red shades.

Example 20

10 parts of the sodium salt of 1-nitroanthraquinone-2-carboxylic acid methyltauride are heated with 50 parts of 20 per cent ammonia in a sealed vessel at 130° C. until unchanged initial material can practically no longer be detected. The dyestuff formed is precipitated in the form of its sodium salt by means of sodium chloride and isolated in the usual manner. It is properly 1-aminoanthraquinone-2-carboxylic acid methyltauride and dyes wool from an acid bath clear orange shades.

An aqueous solution of methylamine may be used instead of ammonia. In this case a reaction temperature of only 80° C. is necessary. The methylamino compound thus obtained dyes wool from an acid bath beautiful red shades.

Example 21

5 parts of 1-nitroanthraquinone-2-carboxylic acid amide are heated with 30 parts of a 30 per cent aqueous solution of the sodium salt of taurine for 12 hours in a sealed vessel at 120° C. while stirring.. The mixture is allowed to cool and the red crystals formed are filtered by suction and washed with sodium chloride solution. The compound thus obtained probably contains the radicle of taurine instead of the nitro-group of the initial material. The product dyes wool from an acid bath clear red shades.

*Example 22*

3 parts of 1-methylamino-2-cyano-4-(para-amino-phenyl)-aminoanthraquinone are dissolved in 45 parts of sulphuric acid monohydrate and sulphonated by allowing from 40 to 50 parts of fuming sulphuric acid containing 23 per cent of sulphur trioxide to drop into the solution at room temperature. As soon as a sample dissolves completely in water, which fact indicates that the formation of 1-methylamino-2-cyano-4-(para-aminophenyl)-aminoanthraquinone sulphonic acid is complete, 5 parts of water are added slowly whereby the speed of addition is selected so that the temperature rises up to between 50° and 55° C. This temperature is maintained until a sample dissolves completely in normal hydrochloric acid giving a brown-orange coloration; by the said treatment at from 50° to 55° C. the nitrile group is converted into the carboxylic acid amido group. The reaction mixture is diluted with 400 parts of ice-cold water containing a small amount of bisulphite while stirring. 120 parts of 20 per cent ammonia are added whereby 1-methylaminoanthraquinone-2-carboxylic acid amide-4-(para-aminophenyl)-aminoanthraquinone sulphonic acid formed is neutralized and the dyestuff precipitated in the form of beautiful dark green prisms. It is identical with that obtainable according to the second paragraph of Example 9.

*Example 23*

1-nitroanthraquinone-2-carboxylic-acid-N-methylanilide is treated with an aqueous solution of methylamine at between 80° and 110° C. under pressure and the product formed is sulphonated whereby 1-methylamino-anthraquinone-2-carboxylic-acid-N-methyl-anilidosulphonic acid is obtained. 48 parts of the sodium salt of the said sulphonic acid are suspended in 480 parts of concentrated hydrochloric acid and a solution of 17 parts of bromine in 100 parts of a 17 per cent potassium bromide solution is added in the course of half an hour at ordinary temperature. The mixture is stirred at the same temperature until unchanged initial material can no longer be detected. The bromination product which is isolated in the usual manner probably corresponds to the formula

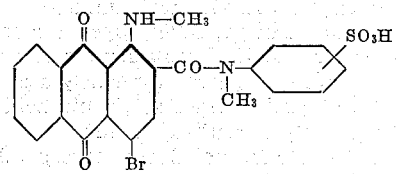

It dyes the animal fibre from acid baths violet red shades.

*Example 24*

53 parts of 1-methylamino-4-bromanthraquinone-2-carboxylic-acid-N-methylanilido-sulphonic-acid (see the preceding example) are dissolved in 540 parts of water while adding 66 parts of sodium bicarbonate and 55 parts of 4-amino-1.1-diphenyl and a small amount of cuprous chloride are added. The mixture is stirred at 90° to 95° until unchanged initial material can no longer be detected. The reaction product is isolated in the usual manner. It corresponds probably to the following formula:

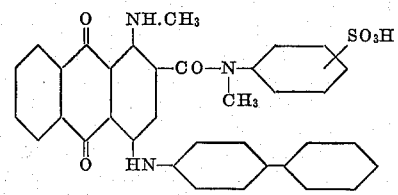

The compound dyes wool from acid baths clear bluish-green shades.

*Example 25*

1-nitroanthraquinone-2-carboxylic-acid-chloride is treated with methyltaurine. The nitro group of the product obtained is replaced by the methylamino group by treatment with an aqueous solution of methylamine. The resulting product is brominated whereby 1-methylamino-4-bromanthraquinone-2-carboxylic-acid-methyltauride is formed. 25 parts of the latter are dissolved in 500 parts of water with the addition of 17 parts of sodium bicarbonate. The solution is stirred with 27 parts of benzidine in the presence of a little cuprous chloride, the temperature being raised up to 90° C. in the course of 3 hours. As soon as initial material can no longer be detected the dyestuff produced is isolated in the usual manner in the form of its sodium salt. It dyes wool from acid baths yellowish-green shades.

*Example 26*

10 parts of 1-nitroanthraquinone-6-carboxylic-acid-amide are heated with 100 parts of paratoluidine at 180° C. while stirring until initial material can no longer be detected. 1-toluidino-anthraquinone-6-carboxylic acid amide thus formed is precipitated by means of methanol; it is sulphonated to yield a sulphonic acid which dyes wool bluish-red shades.

*Example 27*

36 parts of 1-methylamino-4-bromanthraquinone-2-carboxylic-acid-amide are heated in a closed vessel at 150° C. together with 20 parts of potassium acetate, 10 parts of water, 35 parts of meta-aminobenzene sulphonic acid and a little cupric acetate until initial material can no longer be detected. The dyestuff obtained dyes wool from an acid bath reddish-blue shades.

*Example 28*

1.5-dinitroanthraquinone-2.6-dicarboxylic acid is converted into the corresponding dicarboxylic acid chloride by means of thionyl chloride in nitrobenzene. The said dicarboxylic acid chloride is caused to react with concentrated aqueous ammonia under pressure at 120° C. whereby 1.5-diaminoanthraquinone-2.6-dicarboxylic acid amide is produced. The latter is brominated to form 1.5-diamino-4.8-dibromanthraquinone-2.6-dicarboxylic acid amide. 44 parts of the latter are heated with 220 parts of paratoluidine in the presence of anhydrous potassium acetate and some cupric acetate at from 140 to 150° C. while stirring until initial material can no longer be detected. The reaction product is precipitated by the addition of ethyl alcohol in the form of green-blue needles. It is rather difficultly soluble in the usual organic solvents and is converted by sulphonation in the usual manner into a dyestuff dyeing wool from acid baths greenish-blue shades.

*Example 29*

A mixture of 29 parts of 1-aminoanthraquinone-2-carboxylic acid chloride, 25 parts of methyltaurine (sodium salt), 16 parts of calcined sodium carbonate and 500 parts of water is stirred at 50° C. until the whole forms a solution which is orange-yellow in color. The said temperature is maintained until the separation of orange-yellow crystals begins. 50 parts of sodium chloride are added, the mass is allowed to cool and washed with sodium chloride solution. The dyestuff thus obtained dyes wool from acid baths clear orange shades.

*Example 30*

6 parts of 1.4-dichloranthraquinone-2-carboxylic acid amide, 5 parts of dehydrated sodium acetate and 0.1 part of copper acetate are heated in 30 parts of paratoluidine at 130° C. At the beginning the coloration of the melt is red; by and by it changes to blue-red, then olive-blue and finally to green. If the coloration does no longer change, the mass is allowed to cool somewhat and diluted with 60 parts of warm ethyl alcohol. If the mass is completely cooled the reaction product precipitated in long green needles is filtered off by suction and washed with methyl alcohol; it is 1.4-di-para-toluidoanthraquinone-2-carboxylic acid amide which may be readily sulphonated in weak fuming sulphuric acid yielding a dyestuff dyeing wool yellowish green shades of very good fastness properties.

What we claim is:—

1. The process of producing dyestuffs for animal fibres of the anthraquinone series corresponding to the general formula

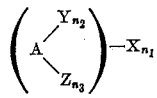

(wherein A means an anthraquinone radicle, $n_1$, $n_2$, and $n_3$ whole numbers above zero, X a —$SO_3H$ group, Y a group —$N.R_1R_2$ attached to an alpha-position of the said anthraquinone radicle and Z a radicle —$CO.N.R_3R_4$ and wherein $R_1$, $R_3$ and $R_4$ stand for a member of the group consisting of hydrogen, alkyl, cycloalkyl, aralkyl, hydroxyalkyl, aryl groups and aryl groups substituted by a member of the group consisting of halogen, alkyl, cycloalkyl, hydroxyl, alkoxyl, amino and acylated amino groups, and $R_2$ stands for a member of the group consisting of hydrogen, alkyl, cycloalkyl and aralkyl groups), which comprises using as initial material an anthraquinone containing at least one of the substituents X, Y and Z as defined above and acting thereon with an agent introducing the missing of the said substituents.

2. The process of producing dyestuffs for animal fibres of the anthraquinone series corresponding to the general formula

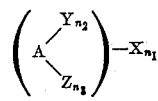

(wherein A means an anthraquinone radicle, $n_1$ and $n_2$ whole numbers from 1 to 4 inclusive and $n_3$ the number 1 or 2, X a —$SO_3H$ group, Y a group —$N.R_1R_2$ attached to an alpha-position of the said anthraquinone radicle and Z a radicle —$CO.N.R_3R_4$ and wherein $R_1$, $R_3$ and $R_4$ stand for a member of the group consisting of hydrogen, alkyl, cycloalkyl, aralkyl, hydroxyalkyl, aryl groups and aryl groups substituted by a member of the group consisting of halogen, alkyl, cycloalkyl, hydroxyl, alkoxyl, amino and acylated amino groups, and $R_2$ stands for a member of the group consisting of hydrogen, alkyl, cycloalkyl and aralkyl groups), which comprises using as initial material an anthraquinone containing at least one of the substituents X, Y and Z as defined above and acting thereon with an agent introducing the missing of the said substituents.

3. The process of producing dyestuffs for animal fibres of the anthraquinone series corresponding to the general formula

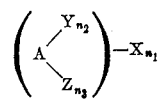

(wherein A means an anthraquinone radicle, $n_1$ a whole number from 1 to 4 inclusive and $n_2$ and $n_3$ the number 1 or 2, X a —$SO_3H$ group, Y a group —$N.R_1R_2$ attached to an alpha-position of the said anthraquinone radicle and Z a radicle —$CO.N.R_3R_4$ and wherein $R_1$, $R_3$ and $R_4$ stand for a member of the group consisting of hydrogen, alkyl, cycloalkyl, aralkyl, hydroxyalkyl, aryl groups and aryl groups substituted by a member of the group consisting of halogen, alkyl, cycloalkyl, hydroxyl, alkoxyl, amino and acylated amino groups, and $R_2$ stands for a member of the group consisting of hydrogen, alkyl, cycloalkyl and aralkyl groups), which comprises using as initial material an anthraquinone containing at least one of the substituents X, Y and Z as defined above and acting thereon with an agent introducing the missing of the said substituents.

4. The process of producing dyestuffs for animal fibres of the anthraquinone series which comprises introducing a sulphonic acid group into an alpha-aminoanthraquinone containing a carboxyl amido group.

5. The process of producing dyestuffs for animal fibres of the anthraquinone series which comprises introducing an alpha-amino group into a sulphonic acid of an anthraquinone-carboxylic-acid-amide.

6. The process of producing dyestuffs for animal fibres of the anthraquinone series which comprises introducing a carboxyl amido group into a sulphonic acid of an alpha-aminoanthraquinone.

7. The process of producing dyestuffs for animal fibres of the anthraquinone series which comprises introducing simultaneously an alpha-amino group and a sulphonic acid group into an anthraquinone carboxylic acid amide.

8. The process of producing dyestuffs for animal fibres of the anthraquinone series which comprises introducing simultaneously a carboxylic acid amido group and a sulphonic acid group into an alpha-aminoanthraquinone.

9. Dyestuffs for animal fibres corresponding to the general formula

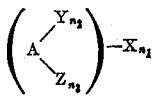

wherein A means an anthraquinone radicle, $n_1$, $n_2$ and $n_3$ whole numbers above zero, X a —$SO_3H$ group, Y a group —$N.R_1R_2$ attached to an alpha-position of the said anthraquinone radicle and Z a radicle —CO.N.R₃R₄ and wherein R₁, R₃ and R₄ stand for a member of the group consisting of hydrogen, alkyl, cycloalkyl, aralkyl, hydroxyalkyl, aryl groups and aryl groups substituted by a member of the group consisting of halogen, alkyl, cycloalkyl, hydroxyl, alkoxyl, amino and acylated amino groups, and R₂ stands for a member of the group consisting of hydrogen, alkyl, cycloalkyl and aralkyl groups.

10. Dyestuffs for animal fibres corresponding to the general formula

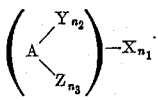

wherein A means an anthraquinone radicle, $n_1$ and $n_2$ whole numbers from 1 to 4 inclusive and $n_3$ the number 1 or 2, X a —SO₃H group, Y a group —N.R₁R₂ attached to an alpha-position of the said anthraquinone radicle and Z a radicle —CO.N.R₃R₄ and wherein R₁, R₂ and R₄ stand for a member of the group consisting of hydrogen, alkyl, cycloalkyl, aralkyl, hydroxyalkyl, aryl groups and aryl groups substituted by a member of the group consisting of halogen, alkyl, cycloalkyl, hydroxyl, alkoxyl, amino and acylated amino groups, and R₂ stands for a member of the group consisting of hydrogen, alkyl, cycloalkyl and aralkyl groups.

11. Dyestuffs for animal fibres corresponding to the general formula

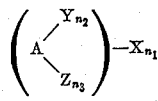

wherein A means an anthraquinone radicle, $n_1$ a whole number from 1 to 4 inclusive and $n_2$ and $n_3$ the number 1 or 2, X a —SO₃H group, Y a group —N.R₁R₂ attached to an alpha-position of the said anthraquinone radicle and Z a radicle —CO.N.R₃R₄ and wherein R₁, R₃ and R₄ stand for a member of the group consisting of hydrogen, alkyl, cycloalkyl, aralkyl, hydroxyalkyl, aryl groups and aryl groups substituted by a member of the group consisting of halogen, alkyl, cycloalkyl, hydroxyl, alkoxyl, amino and acylated amino groups, and R₂ stands for a member of the group consisting of hydrogen, alkyl, cycloalkyl and aralkyl groups.

12. Dyestuffs for animal fibres corresponding to the general formula

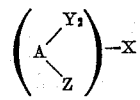

wherein A is an anthraquinone radicle, X a —SO₃H group, Y a group —N.R₁R₂ attached to an alpha-position of the said anthraquinone radicle and Z a radicle —CO.N.R₃R₄ and wherein R₁, R₃ and R₄ stand for a member of the group consisting of hydrogen, alkyl, cycloalkyl, aralkyl, hydroxyalkyl, aryl groups and aryl groups substituted by a member of the group consisting of halogen, alkyl, cycloalkyl, hydroxyl, alkoxyl, amino and acylated amino groups, and R₂ stands for a member of the group consisting of hydrogen, alkyl, cycloalkyl and aralkyl groups.

13. The dyestuff corresponding to the formula

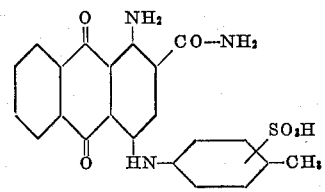

14. The dyestuff corresponding to the formula

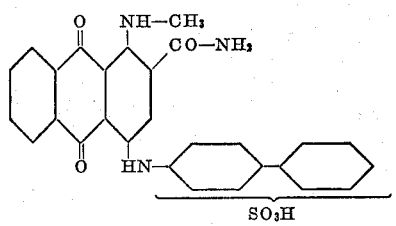

15. The dyestuff corresponding to the formula

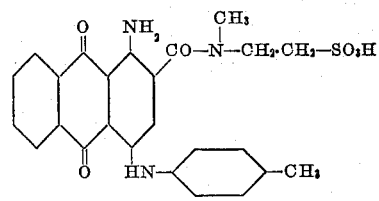

PAUL NAWIASKY.
BERTHOLD STEIN.
ROBERT ZELL.